United States Patent [19]

Mizuno et al.

[11] Patent Number: 4,566,100
[45] Date of Patent: Jan. 21, 1986

[54] BIT ERROR RATE MEASURING SYSTEM

[75] Inventors: Toshio Mizuno, Tanashi; Gunkichi Satoh, Yokohama; Michihisa Ohkawa, Tokyo, all of Japan

[73] Assignee: Kokusai Denshin Denwa Co., Ltd., Tokyo, Japan

[21] Appl. No.: 486,319

[22] Filed: Apr. 19, 1983

[30] Foreign Application Priority Data

Apr. 20, 1982 [JP] Japan ................... 57-64666

[51] Int. Cl.⁴ .............................. G06F 11/00
[52] U.S. Cl. .......................... 371/5; 375/86; 375/52
[58] Field of Search ............ 371/5, 6; 375/86, 97, 375/100, 52, 111; 455/22, 316

[56] References Cited

U.S. PATENT DOCUMENTS

| | | | |
|---|---|---|---|
| 4,189,622 | 2/1980 | Foslee | 375/52 |
| 4,291,403 | 9/1981 | Waddill et al. | 371/5 |
| 4,305,150 | 12/1981 | Richmond et al. | 371/6 |
| 4,355,044 | 10/1982 | Uzunoglu | 375/86 |
| 4,367,550 | 1/1983 | Douvcine | 371/5 |

OTHER PUBLICATIONS

Takenaka, et al, "Bit Error Rate Monitor for Four Phase PSK System", Conference: ICC 1980, 8–12 Jun. 1980.

Goodins, "Performance Monitor Techniques for Digital Receivers Based on Extrapolation of Error Rate", IEEE Transaction, vol. Com. 16, No. 3, Jun. 1968.

Primary Examiner—Michael R. Fleming

[57] ABSTRACT

A bit error rate of M-phase digital phase-modulated waves is measured by the steps comprising multiplying a received wave by M, phase-detecting the M-multiplied signal either directly or after frequency conversion, detecting errors by comparing the output level of the phase detection with a threshold, and counting the number of such errors. By employing above mentioned system, a bit error rate can be measured easily and accurately by a simple circuit structure.

15 Claims, 6 Drawing Figures

BIT ERROR RATE MEASURING SYSTEM

BACKGROUND OF THE INVENTION

The present invention relates to a system for measuring a bit error rate of a received signal in digital phase-modulated waves which has been modulated by a random data sequence.

DESCRIPTION OF THE PRIOR ART

Data communication and facsimile transmission systems are increasingly utilized in recent years. Digital phase modulation systems are widely used for communication systems such as ground microwave and satellite communication circuits. The quality of the transmission circuits must be monitored continuously and the signal quality in a digital phase modulation system is usually evaluated in terms of a bit error rate. If the bit error rate of a received signal becomes deteriorated, it is necessary to increase transmission power or to have route switching diversity. The continuous monitoring of the bit error rate is critical for controlling it.

There have been proposed various methods for measuring bit error rate for digital phase-modulated waves. Examples are shown below in (i) to (v):

(i) A method of inserting a known pattern in a data sequence on the transmission side and detecting the error of the received pattern on the receiver side.

(ii) A method of segmenting a data sequence into blocks on the transmission side, adding parity bits to each block, and conducting parity check on the receiver side to detect an error.

(iii) A method of using an error correction code in a data sequence on the transmission side, and counting the error correction pulses on the receiver side.

(iv) A method (Offset-sampling method) of sampling received and demodulated waves at a normal timing and at a timing deviated therefrom by a predetermined value, detecting mismatching between both sampled values, and estimating a bit error rate from the detected result.

(v) A method of directly phase-detecting a received wave, and counting pulses which enter specified regions.

Out of said various methods, the methods (i) to (iii) are superior in measurement accuracy. Since they require additional data in the transmission data sequence for error detection, the data transmission rate becomes deteriorated. As the receiver side needs to process special signals for detecting errors, the communication apparatus unavoidably becomes complex.

The method (iv) is defective in that a large error occurs by waveform distortion.

The method (v) is also detrimental in that the measuring accuracy largely depends on the phase jitter of a regenerated carrier. For this reason, in case when a transmission line includes non-linear amplifiers (for instance, a travelling-wave tube) which exhibit AM/AM conversion or AM/PM conversion such as in satellite communication circuits, phase jitter causes a large error in measuring of bit error rate. But this method (v) is advantageous in that the data transmission rate will not be victimized as it does not require special data processing for the transmission data sequence and therefore it needs no changes in the communication apparatuses on the transmission side.

An ideal bit error rate measuring system may be realized if the measuring method by the phase detection mentioned above in (v) is improved to utilize its advantages and still to minimize errors even if phase jitter exists in carriers. Referring now to FIGS. 1 and 2, the principle of the measuring method by the phase detection and the prior art will be described.

FIG. 1 shows a phaser diagram of 4-phase digital phasemodulated wave. Error phenomena is discussed referring to the figure. In FIG. 1, points A through D correspond to the transmitted data having phases $\pi/4$, $3\pi/4$, $-\pi/4$ and $-3\pi/4$. The region I to IV denote phase regions of received data including the points A to D. Even if a 4-phase digital phase-modulated wave of $\cos(\omega t + \theta)$ [wherein $\theta = \pm\pi/4, \pm 3\pi/4$] is affected by a noise to vary $\theta$, if the received data corresponding to the transmitted data of A to D are in respective phase region I to IV, there will be no errors. An error is caused only when, for instance, even if a transmitted data is A, the received data is included in the regions other than the region I. (i.e. the regions II or IV).

It is known that when the ratio of carrier power to noise power (C/N) is comparatively high, errors concentrate on hatched regions a to d shown in FIG. 1. In other words, almost all of the correct received data do not come in said error regions a to d, but concentrate in the vicinity of points A to D. The method (v) mentioned above is based upon such a discovery. That is, a bit error rate can be measured equivalently by counting the number of pulses which enter the error regions a to d and comparing the counted value with the table of pulse number vs. bit error rate which has been calibrated in advance.

FIG. 2 shows an example of prior art measuring circuits wherein a 4-phase digital phase modulated wave $\cos(\omega t + \theta)$ is input to the terminal 1. The reference numeral 2 denotes a 4-multiply circuit, 3 a bandpass filter of which center angle frequency is $4\omega$, 4 a ¼ frequency divider and 5 a phase shift circuit having the phase shift of $\pi/2$. The above components generate a regenerative carrier $\cos \omega t$, $\sin \omega t$ which demodulates received data. The reference numerals 6 and 7 denote phase shift circuits having phase shift of $\phi$ respectively, 8 and 9 phase shift circuits having phase shift of $-\phi$ respectively. The above components generate reference carriers for phase detection $\cos(\omega t + \theta)$, $\cos(\omega t - \phi)$, $\sin(\omega t + \phi)$ and $\sin(\omega t - \phi)$ which form boundaries of the error regions a to d shown in FIG. 1. The reference numerals 10 to 13 denote phase detection circuits respectively, 14 to 17 level discrimination circuits respectively, 18 to 21 inverters, 22 to 25 AND gates, 26 an OR gate and 27 a counter. The above components discriminate whether a received data has entered error regions or not, and count pulses which enter in error regions. The reference numeral 28 denotes an output terminal.

As described in the foregoing, the phase of the regenerative carrier $\cos \omega t$, $\sin \omega t$ may cause jitter depending on the transmission system. If there arises jitter in the phase, that will vary the phase of the reference carrier for phase detection, thereby making an error in measuring bit error rate measuring. It is evident from FIG. 1 that the number of the error regions coincides with the number of digital phase modulation according to the method (V). It, therefore, requires circuits for measuring such as a phase detection circuit in the number identical to the number of phases. This is detrimental since it complicates the measuring system.

SUMMARY OF THE INVENTION

The object of the present invention is to provide a system which can accurately measure by a simple circuit structure a bit error rate of received signals in digital phase-modulated waves which are modulated by random data sequence.

The above object is achieved by multiplying a digital phase-modulated waves having M number of phases by M in an M-multiplying circuit, phase-detecting the output from the M-multiplying circuit either directly or after frequency conversion in a phase detection circuit, comparing the output level of the phase detection circuit with a threshhold in a discriminating circuit to detect errors and counting the output from the discriminating circuit with a counter.

DETAILED DESCRIPTION OF PREFERRED EMBODIMENTS

Figure 4:
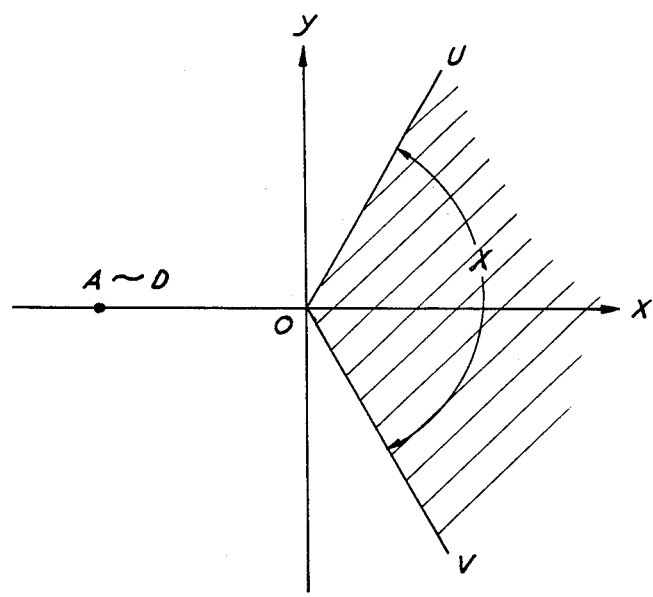
FIG. 4 is a vector diagram to explain the principle of this invention.
Figure 2:
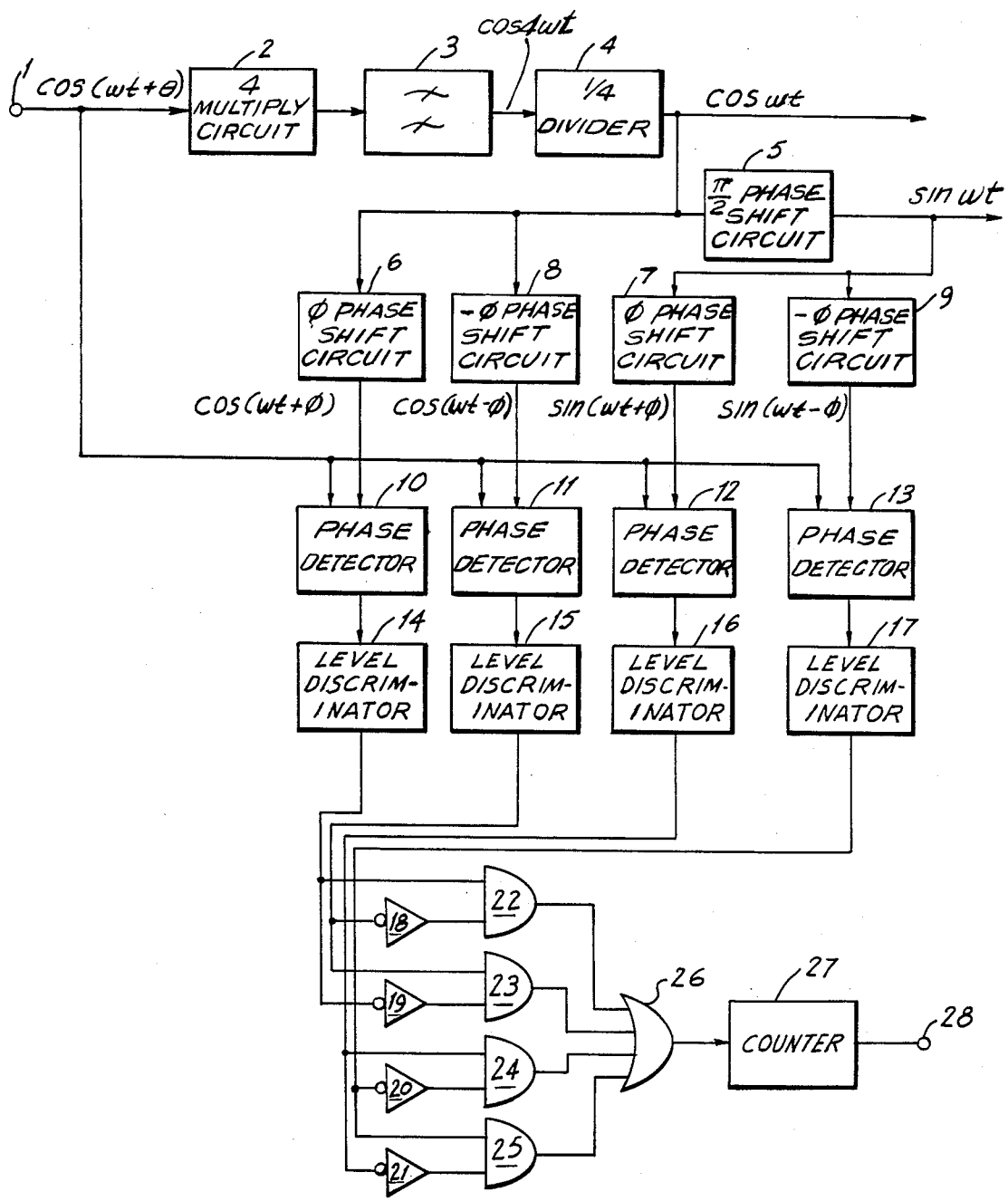
FIG. 2 is a block diagram to show prior art.
Figure 3:
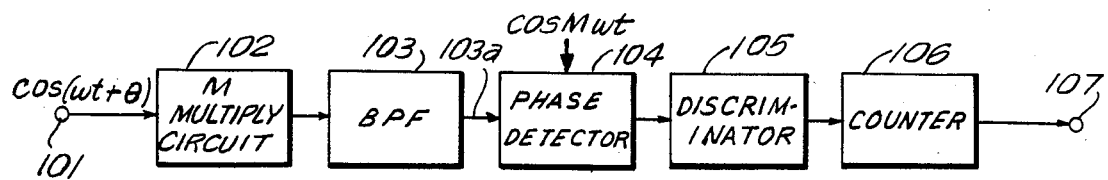
FIG. 3 is a block diagram to explain the principle of this invention.

Referring now to FIGS. 3 to 6, the bit error rate measuring system according to the present invention is described hereinbelow. Referring to FIGS. 3 and 4, the principle of this invention is first described. In FIG. 3, the reference numeral 101 denotes an input terminal to which an M-phase digital phase-modulated wave which has been received from satellite communication circuits or the like is fed directly or after being frequency-converted. The reference numeral 102 denotes an M-multiply circuit, 103 a bandpass zonal filter to extract components close to M-multiple of the carrier frequency of the input signal $\cos(\omega t+\theta)$, 104 a phase detector circuit to detect the output from the bandpass zonal filter 103, 105 a discriminating circuit to discriminate the level by sampling the detection output, 106 a counter and 107 an output terminal. Present invention will now be explained using a 4-phase digital phase-modulated wave as an example. The 4-phase digital phase modulated wave $\cos(\omega t+\theta)$ shown in FIG. 1 (wherein $\theta=\pm\pi/4, \pm 3\pi/4$) is multiplied by 4 in the 4-multiply circuit 102, passes through the bandpass zonal filter 103 and becomes $\cos(4\omega t+4\theta)$. As $4\theta=\pm\pi, \pm 3\pi$, the filter output 103a becomes $\cos(4\omega t+\pi)$ unless it involves a noise. The filter output 103a is generally expressed in a phasor diagram as shown in FIG. 4. In short, if there is no error, the 4-multiplied output vector largely concentrates in the negative region on the x-axis in the phasor diagram and almost all of the errors concentrate in the region X indicated by the hatched lines in FIG. 4. Based on the above facts, it is possible to detect the number of bits which are in the region X in FIG. 4 by phase-detecting the filter output 103a in the phase detection circuit 104 by using the carrier $\cos 4\omega t$ having a 4-fold frequency, discriminating the positive/negative of the detection output in a discriminating circuit 105, and counting the output pulses therefrom in the counter 106. As a given relation holds between the number of bits and the bit error rate, if a table is calibrated for the relation therebetween, a bit error rate will be able to be known at a glance by referring to the table.

Figure 1:
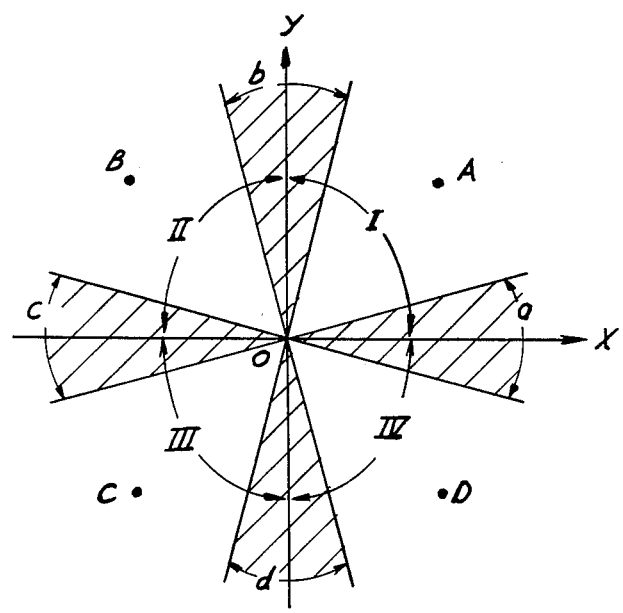
FIG. 1 is a vector diagram of a 4-phase digital phase modulated wave in order to explain the errors in digital phase modulation.

As it is evident from comparison of FIG. 1 and FIG. 4, according to this invention, received data which causes errors concentrate in the region X on the positive side of the axis x of the phasor diagram and correct received data corresponding to transmitted data concentrate in the negative region on the axis x therein. Therefore, even if phase jitter occurs in the input carriers, influence of the phase jitter in the measuring errors is almost negligible. Further, as the regions to which errors enter can be reduced from 4 in FIG. 1 to 1 in FIG. 4, the circuit structure can be simplified. Errors can be detected by forming carriers $\sin(4\omega t+\phi')$, and $\sin(4\omega t-\phi')$ corresponding to the boundaries OU and OV in FIG. 4 out of the regenerative carrier $\cos 4\omega t$ (when $\phi'$ is $\pi/2$) and discriminating pulses entering the regions between OU and OV by a discriminating circuit 105, instead of discriminating the output of the phase detection by positive/negative as mentioned above. In case when the phase angle of the digital phase modulation is $\theta=0, \pm\pi/2, \pi$, the positional relation between correct data and errors will become reversed in the phasor diagram.

The principle of this invention has been described referring to the case of a 4-phase digital phase-modulated wave as an example, but the phase relation expressed in FIG. 4 also holds for M-phase digital phase-modulated waves generally. Therefore, the present invention is applicable thereto.

Figure 5:
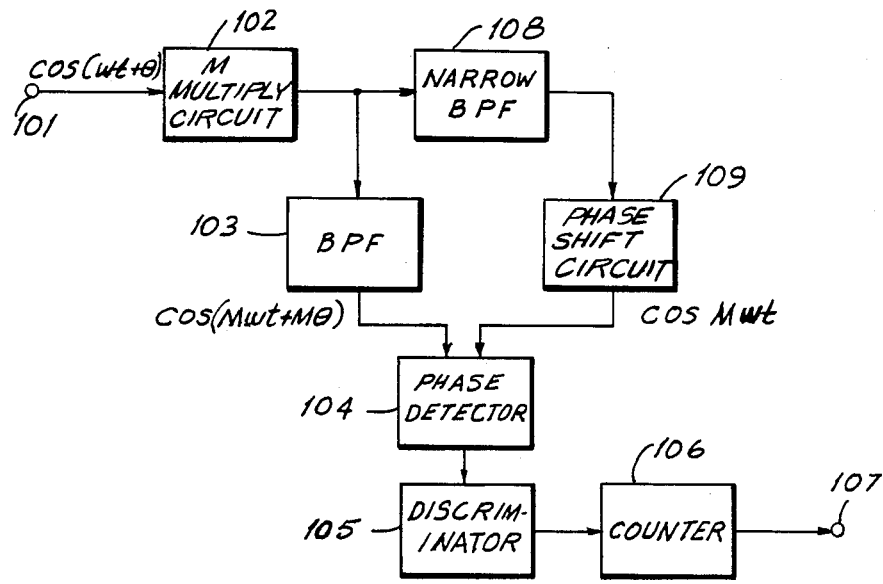
FIG. 5 is a block diagram to show a preferred embodiment according to the present invention.

FIG. 5 shows an embodiment according to the present invention. This embodiment uses a carrier regenerative circuit used as a part of demodulator for digital phase-modulated waves. In the figure, the M-multiply circuit 102, the bandpass zonal filter 103, the phase detection circuit 104, the discriminating circuit 105 and the counter 106 operate similarly to those shown in FIG. 3. The reference numeral 108 denotes a narrow bandpass filter which extracts only M-multiplied carrier wave component out of the outputs obtained from the M-multiply circuit 102 in non-linear characteristics. The reference numeral 109 denotes a phase shift circuit which forms phase detection carriers $\cos M\omega t$ required for the detection of errors.

Figure 6:
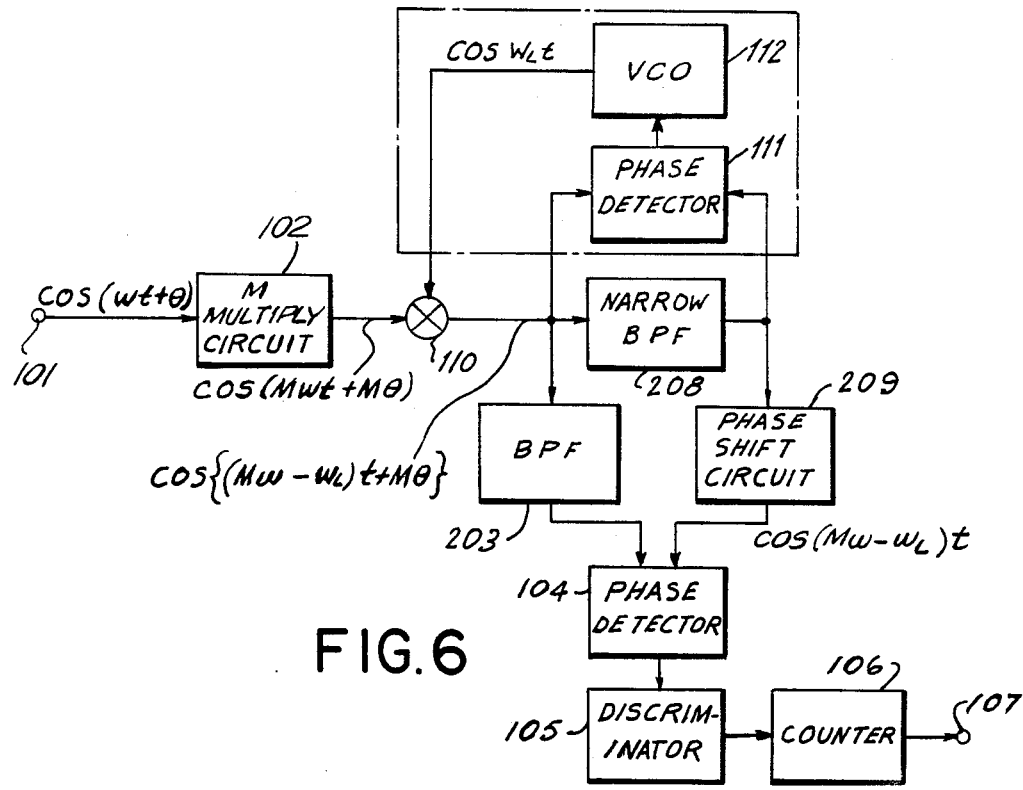
FIG. 6 is a block diagram to show another preferred embodiment according to the present invention.

The above description has been given to the case where an M-multiplied M-phase digital phase-modulated carrier is directly phase-detected. If the M-multiplied output is converted to a low frequency and then phase-detected, the circuit will be constructed more easily. Even if the carrier is frequency-converted, as the phase relation shown in FIG. 4 holds, operational function thereof will be identical to those of the case when frequency conversion is not conducted. As an example of this conversion, FIG. 6 shows another embodiment of this invention which carries out frequency-conversion after M-multiplying and which is provided with frequency-controlling function. In FIG. 6, the M-multiply circuit 102, the phase-detection circuit 104, the discriminating circuit 105 and the counter 106 are identical to those shown in FIGS. 3 and 5 and the bandpass zonal filter 203, the narrow bandpass filter 208 and the phase shift circuit 209 are identical to 103, 108 and 109 shown in FIGS. 3 and 5 in basic operation except for the operational frequencies. The reference numeral 110 denotes a frequency converter. It it is assumed that the local oscillation signal thereof is $\cos\omega_L t$, the M-multiplied output $\cos(M\omega t = M\theta)$ becomes $\cos\{(M\omega-\omega_L)t+M\theta)\}$ in response to the frequency conversion, but the phase component $M\theta$ remains unchanged. Therefore, if $\cos\{(M\omega-\omega_L)t+M\theta\}$ is phase-detected with a carrier of $\cos(M\omega-\omega_L)$, the positional relation in a phasor diagram thereof will be identical to the one shown in FIG. 4. In case the phase varies due to a noise, errors will be detected in a manner similar to that in FIGS. 3 and 5. The phase detection circuit 111 and the voltage control oscillator (VCO) 112 circumscribed by the two-dott chains constitute an automatic frequency controller (AFC) section which can control the output frequency of the frequency converter 110 so as not to deviate from the central frequency of the narrow bandpass filter 208 even if the input signal or the M-phase digital phase-modulated wave varies its frequency. In other words, the phase detection circuit 111 compares the phase of input side of the narrow bandpass filter 208 with that of the output side, controls the oscillation frequency of the local oscillator VCO 112 with the output thereof and causes the frequency of the input signal of the narrow bandpass filter 208 to coincide with the central frequency thereof.

As described in detail in the foregoing, according to the present invention, errors present in M-phase digital phase-modulated waves which are received with noises can be detected accurately but simply, thereby remarkably facilitating evaluation of the error rate. This invention can be applied to both cases where the M-phase digital phase modulation method is either a continuous mode or a burst mode.

We claim:

1. A system for equivalently measuring bit error rate of received M-phase digital phase-modulated waves by steps comprising multiplying a frequency of an M-phase digital phase-modulated wave by M, wherein M is a positive integer, phase-detecting the M-multiplied signal directly or after frequency conversion by using a reference carrier which is orthogonal to a boundary of an error region in a phasor diagram, detecting errors by comparing the phase detection output with a given threshold which is determined so as to correspond to said boundary of the error region, and counting the number of pulses which represent errors.

2. The system for bit error rate measuring as claimed in claim 1, wherein the bit error rate is measured from the number of counted pulses by referring the same to a table of the pulse number vs. bit error rate which has been measured in advance at a receiver side by receiving a data sequence inserted in one of a known pattern, a parity bit and an error correction code at a transmission side.

3. A system for equivalently measuring bit error rate in received M-phase digital phase-modulated waves by steps comprising an M-multiply circuit which multiplies a frequency of an M-phase digital phase-modulated wave by M, wherein M is a positive integer.
   a phase detection circuit which phase-detects the output from said M-multiply circuit either directly or after frequency conversion by using a reference carrier which is orthogonal to a boundary of an error region in a phasor diagram,
   a discriminating circuit which compares the output level from said phase-detection circuit with a given threshold which is determined so as to correspond to said boundary of the error region and detects errors,
   and a counter which counts the output pulses from said discriminating circuit.

4. The system for measuring bit error rate as claimed in claim 3, which further comprises a table of the number of pulses against bit error rate which has been measured in advance at a receiver side by receiving a data sequence inserted in one of a known pattern, a parity bit and an error correction code at a transmission side for comparing the content of the table with the counter output from the counter.

5. The bit error rate measuring system as claimed in claim 3 or 4 which is provided with a band pass filter to pass M-multiplied frequencies at a step prior to the phasedetection circuit.

6. The bit error rate measuring system as claimed in claim 5, which is further provided with a narrow band pass filter to pass M-multiplied frequencies which is coupled to a step subsequent to the M-multiply circuit and a phase shift circuit to correct the phase of the output from said Narrow band pass filter as the means to feed a reference carrier to the phase detection circuit.

7. The bit error rate measuring system as claimed in claim 6 wherein the threshhold of the discriminating circuit is at 0 level.

8. The bit error rate measuring system as claimed in claim 5 wherein the threshhold of the discriminating circuit is at 0 level.

9. The bit error rate measuring system as claimed in claim 3, or 4 which is further provided with a narrow band pass filter to pass M-multiplied frequencies which is coupled to a step subsequent to the M-multiply circuit and a phase shift circuit to correct the phase of the output from said filter as the means to feed a reference carrier to the phase detection circuit.

10. The bit error rate measuring system as claimed in claim 9 wherein the threshhold of the discriminating circuit is at 0 level.

11. The bit error rate measuring system as claimed in claim 3 or 4 which is provided with a frequency down converter at a step subsequent to the M-multiply circuit, another phase detection circuit which detects the phase difference between the signals input to the phase detection circuit and the reference carrier, and a voltage control oscillator of which oscillation frequency is controlled by the output from said detection circuit.

12. The bit error rate measuring system as claimed in claim 11 which is further provided as a means to generate a reference carrier with a narrow band pass filter coupled to a step subsequent to the down converter and a phase shift circuit to correct the phase of the output from said filter.

13. The bit error rate measuring system as claimed in claim 12 wherein the threshhold of the discriminating circuit is at 0 level.

14. The bit error rate measuring system as claimed in claim 11 wherein the threshhold of the discriminating circuit is at 0 level.

15. The bit error rate measuring system as claimed in claim 3 or 4, wherein the threshhold of the discriminating circuit is at 0 level.

* * * * *